Jan. 4, 1949.  C. E. MANNING  2,458,183
METHOD OF FORMING MANIFOLDS
Filed May 14, 1945
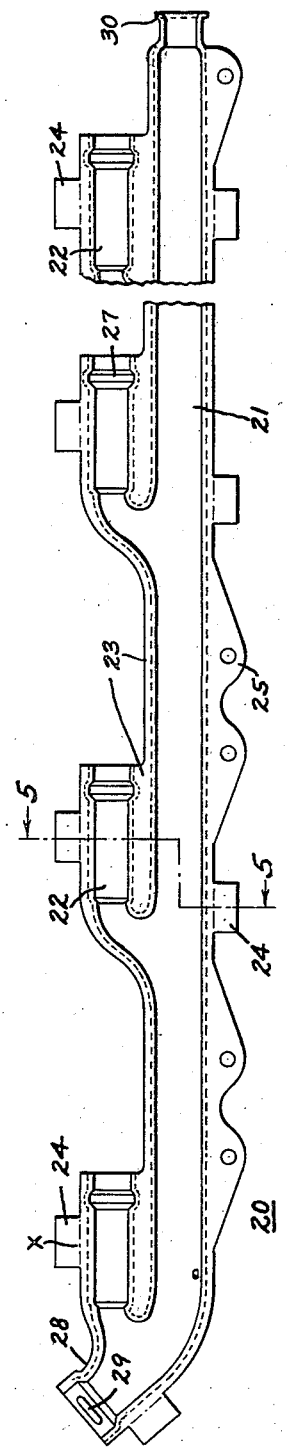
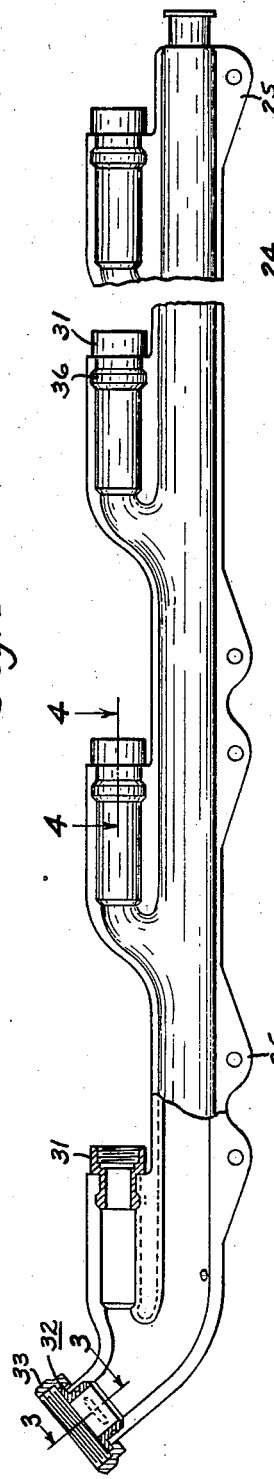
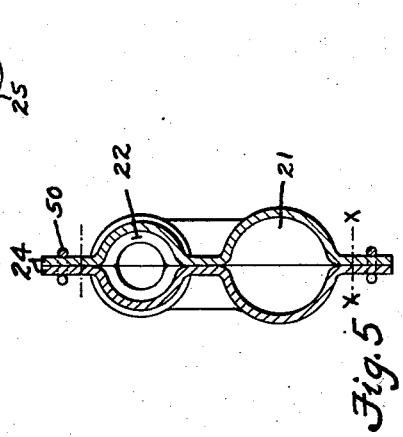
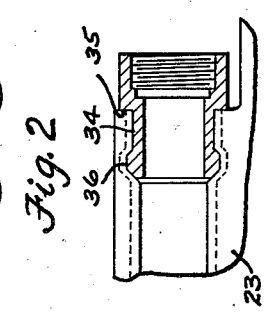
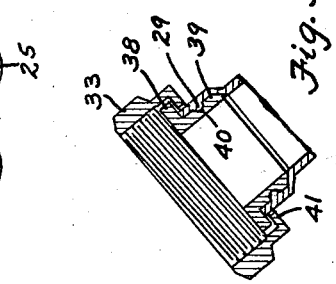
INVENTOR
Charles E. Manning
BY
Spencer, Hardman & Fehr
HIS ATTORNEYS Patented Jan. 4, 1949

2,458,183

UNITED STATES PATENT OFFICE 2,458,183

METHOD OF FORMING MANIFOLDS

Charles E. Manning, Warren, Ohio, assignor to General Motors Corporation, Detroit, Mich., a corporation of Delaware Application May 14, 1945, Serial No. 593,573

2 Claims. (Cl. 113—116)

The present invention relates to a method by which hollow articles can be made from half-shell members that can be easily and nicely formed into any desired shape and then assembled and bonded together to form the hollow article. In accordance with the invention the hollow article is formed basically of a composite sheet having a thicker base layer and a thinner bonding layer having lower melting point than the base layer. For example the composite sheet may be made of two different alloys of aluminum, the alloy of the thinner bonding layer being a silicon alloy having lower melting point than the alloy of the thicker base layer and comprising about 10% of the total thickness of the composite sheet.

One of the uses of the present method is in the manufacture of spark plug cable manifolds for internal combustion engines. Heretofore it has been the practice to make such manifolds by joining together many separately fabricated pieces of tubing. The procedure is expensive both as to labor and material. Furthermore it is difficult to make a cable manifold with branch portions extending parallel to the main portion and in closely spaced relation therewith.

In the production of hollow articles by methods which have been practiced heretofore the principal factors which limit the speed of production are clamping operations, expensive jigging operations and numerous welding and finishing operations. The present invention aims particularly to increase the speed of manufacture of hollow articles. This is accomplished by the use of half-shell members punched from sheet metal that have flanges provided with tabs extending laterally therefrom through which staples are forced to clamp the half-shell together. After the members are bonded together the tabs are severed from the so formed hollow article leaving a neat outside appearance, thus eliminating the expensive clamping operations, the numerous welding operations and the expensive jigging operations ordinarily required in existing methods of making hollow articles.

Further objects and advantages of the present invention will be apparent from the following description, reference being had to the accompanying drawings wherein a preferred embodiment of the present invention is clearly shown.

In the drawings:

Fig. 1 is a plan view of an elongated blank of sheet metal which has been shaped according to the first step of the method to be described.

Fig. 2 is a top plan view showing the configuration of a manifold after the completion of the process.

Fig. 3 is a sectional view taken on line 3—3 of Fig. 2.

Fig. 4 is a sectional view on an enlarged scale and taken on line 4—4 of Fig. 2 and showing a bushing in section.

Fig. 5 is a sectional view taken on line 5—5 of Fig. 1 but showing a pair of blanks clamped together.

The first step in the manufacture of the hollow article embodying the present invention is the step of punching two metal blanks 20 from sheet metal, for example, aluminum which when bonded together form the manifold. One of the blanks is shown in Fig. 1. In view of the fact that the construction of the two parts is similar only one of the pieces will be explained for sake of brevity. It is to be understood however that the arrangement of the channels, recesses, lugs and tabs of the other piece will be opposite to that shown in Fig. 1.

The blank 20 shown in Fig. 1 is punched from a sheet of aluminum and recessed at various places to provide a main half-tubular main channel 21 and a plurality of branch half-tubular recesses 22 extending parallel to the main channel and in closely spaced relation therewith. Each branch recess has one end in direct communication with the main channel while the other end provides an outlet. The piece is so punched as to provide flat flanges 23 on each side of the recesses and lie in a plane parallel to the axis of the channels and recesses. At suitable points the flat flanges are extended laterally to provide tabs 24 and a plurality of lugs 25 which have apertures to receive securing devices for attaching the manifold proper to a support, not shown.

The outer ends of the branch recesses are each formed with a groove or depression 27 while the end 28 of the main channel is provided with a rib 29 to be described. The other end of the main channel is provided with a flange 30.

The next step is to assemble a bushing 31 in each branch recess and a collar 32 and nut 33 assembly in the end 28. The bushing 31 has a reduced portion 34 to provide a shoulder 35 which abuts against the end of the recess 22. The reduced portion 32 has an annular rib or rim 36 which fits into the groove 27. The collar and nut assembly as shown in Fig. 3 has the collar 32 provided with a flange 38 and a reduced portion 39 provided with an annular groove 40 to receive the rib 29 formed in the end 28. The collar is first assembled in the nut 33 having an internal flange 41 which extends under the flange 38 before the nut and collar assembly is positioned in the end 28.

After the pieces 20 are properly fluxed the next step is to place a second piece 20 over the bushings 31 and the collar 32 with the flat flanges 23 and the tabs 24 of each piece 20 in abutting relation. When that is done the pieces cooperate to form a suitable cable chamber, and a plurality of conduits, each conduit capable of receiving an ignition cable. When the two pieces are properly arranged the next step is to clamp the parts 20 together. This is accomplished in any suitable manner, for example, staples 50 may be used which pierce the tabs 24 as shown in Fig. 5. If desired the tabs 24 could be provided with apertures so that rivets could hold the pieces together. After the stapling operation the manifold is passed through a brazing oven having a temperature of about 1115° F.

The present invention is particularly directed to the use of aluminum pieces wherein only the inner surfaces of the sheets change their physical state from solid to a fluid upon application of heat and solidifies upon being cooled. Thus in the present invention the aluminum sheets used comprise a thick base alloy which melts at about 1145 F. and a thin coating of silicon alloy which melts at approximately 1090° F. In the present instance the coating is about one-tenth the thickness of the sheet. When the sheets are deformed to make the half tubular pieces 20 it is important that the coating form the inner surface of hollow article. When the assembled manifold is placed in an oven, the temperature of the oven should be about 1115° F., thus causing the thin coating only to change from a solid state to a fluid state and which when the manifold is subjected to a temperature lower than the melting coating the coating will readily bond the pieces together. After the pieces are bonded together the tabs 24 are severed from the manifold on the lines X in Fig. 1 and X—X as shown in Fig. 5. It is pointed out here that the bushings 31, collars 32 and nut 33 are made of a metal having a melting point higher than that of the coating, thus these elements will not be effected by the heat when placed in the oven to melt the coating. It is to be understood that other metals can be used instead of aluminum.

After the tabs 24 are severed from the manifold the manifold is cleaned, anodized and painted.

From the foregoing it is apparent that the present invention has provided a method wherein an aluminum manifold may be formed and same can be made in any desired shape to meet any difficulties which may arise and at the same time provide a convenient and practical assembly of elements which wil permit quick and easy insert or removal of cables and which is effective from the radio and motor ignition standpoints.

While the embodiments of the present invention as herein disclosed, constitutes a preferred form, it is to be understood that other forms might be adopted, all coming within the scope of the claims which follow.

What is claimed is as follows:

1. The method of making a cable manifold for internal combustion engines comprising the steps which include; deforming a pair of composite sheets of aluminum having a relatively thick layer and a relatively thin layer with the thin layer having a melting point below that of the thick layer, into half-sheel members including a main channel and a plurality of branch channels so that one end of each branch channel is in direct communication with the main channel and the other end forms a grooved outlet and having the outer edges of the chanels flanged outwardly to form contacting surfaces and spaced tabs, the thin layer forming the inner surface of the channels; placing one end of a preformed bushing having a melting point above the inner layer in certain grooved outlets in one of the half shell members; placing the other half shell member over the first half shell member so that the flanges and tabs are adjacent each other; forcing staples through similar placed tabs to hold the members together and the bushings in position; subjecting the members to heat below the melting point of the thick layer and the bushings to render the thin layer in a fluid state for integrally bonding the contacting surfaces to provide an integral manifold unit; and then severing the stapled tabs.

2. The method of making a cable manifold for internal combustion engines comprising the steps which include, providing a composite aluminum alloy sheet having a relatively thick layer having a melting point above a certain temperature and a relatively thin layer of aluminum alloy having a melting point lower than the thick layer forming two complementary half-shell members with a main channel and a plurality of spaced branch channels extending parallel to the main channel and in closely spaced relation therewith so that one end of each branch channel is in direct communication with the main channel and the other end provides an outlet spaced from the main channel and having the edges of channels flanged outwardly to form contacting surfaces and spaced tabs on each member the thin layer forming the inner surfaces of the channels; placing one end of a preformed bushing having a melting point above the thin layer in each outlet of the branch chanels of one of the half shell members; placing the other half-shell member over the first half-shell member so that the flanges and tabs of both members are adjacent each other; riveting the tabs together to hold the shell members together and the bushing in position subjecting the members to heat to render only the thin layer in a fluid state for integrally bonding the contacting surfaces to provide an integral manifold and then removing the tabs.

CHARLES E. MANNING.

REFERENCES CITED

The following references are of record in the file of this patent:

UNITED STATES PATENTS

| Number | Name | Date |
| --- | --- | --- |
| 583,683 | Gersant | June 1, 1897 |
| 1,565,374 | Kramer | Dec. 15, 1925 |
| 2,108,209 | Reilly | Feb. 15, 1938 |
| 2,160,680 | Sandberg | May 30, 1939 |
| 2,258,681 | Hoglund | Oct. 14, 1941 |

FOREIGN PATENTS

| Number | Country | Date |
| --- | --- | --- |
| 126,456 | Great Britain | Nov. 8, 1918 |